Dec. 12, 1933.  C. J. OXFORD  1,938,717
CUTTING TOOL
Filed March 19, 1928
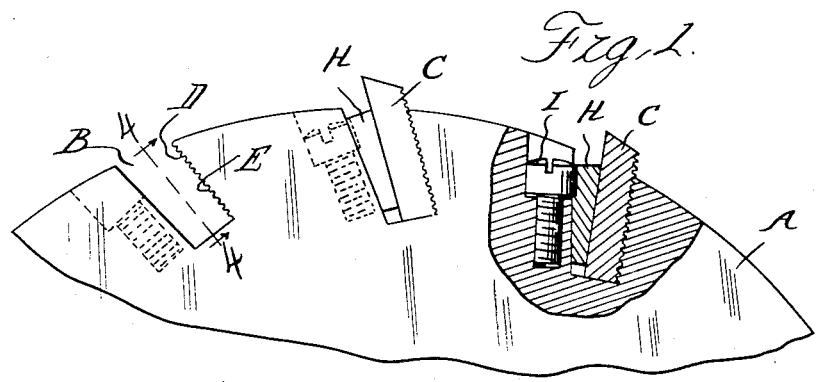
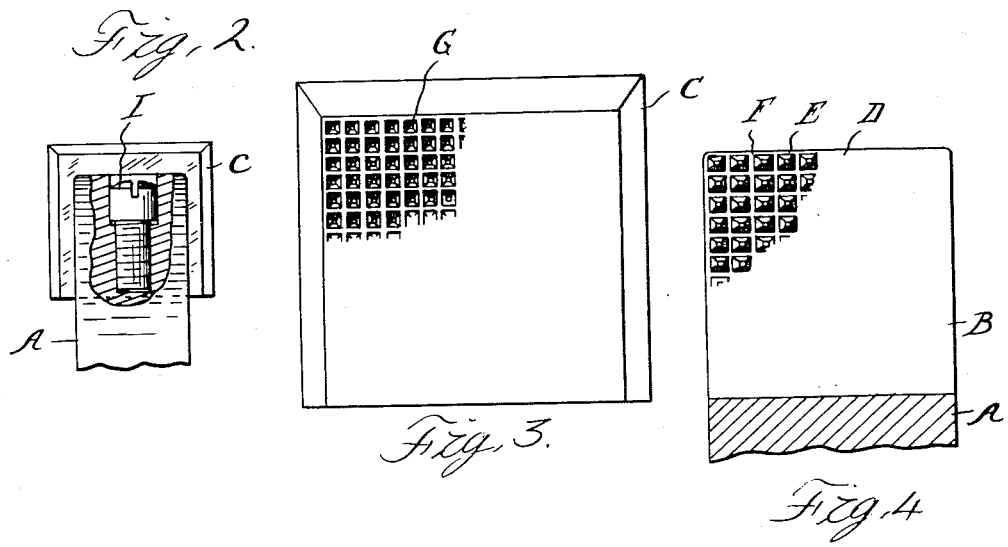
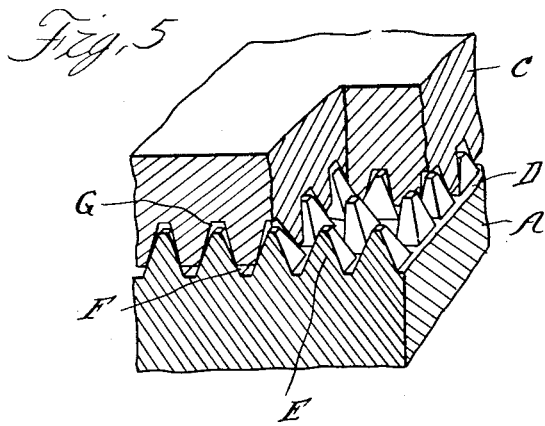
Inventor
Carl J. Oxford Patented Dec. 12, 1933

1,938,717

UNITED STATES PATENT OFFICE 1,938,717

CUTTING TOOL

Carl J. Oxford, Detroit, Mich., assignor to National Twist Drill & Tool Company, Detroit, Mich., a corporation of Michigan Application March 19, 1928. Serial No. 262,972

1 Claim. (Cl. 29—105)

The invention relates to cutting tools and has more particular reference to the construction of milling cutters of that type in which the cutter element is detachable from the holder.

Among the objects of the invention are

First.—To obtain a construction in which the cutter is rigidly locked to its holder so as to be incapable of acidental displacement.

Second.—To provide means for adjusting the cutter either radially or laterally.

Third.—To obtain a longer life for the cutter blade.

With these objects in view the invention consists in the construction as hereinafter set forth.

In the drawing;

Figure 1 is a side elevation of a portion of a milling cutter to which my improvement is applied.

Figure 2 is a sectional end elevation thereof.

Figure 3 is an elevation of the cutter blade detached.

Figure 4 is a sectional elevation on line 4—4 of Figure 1.

Figure 5 is a sectional perspective view of a greatly enlarged scale showing the engagement between the adjacent surfaces of the tool and holder.

In the manufacture of milling cutters with detachable blades it is usual to hold the blades in position by friction. This permits of adjusting to compensate for wear or grinding but there is always danger of a blade coming loose causing great injury to either the cutter or the work. With certain constructions where the face of the blade has been grooved to engage complementary grooves in the holder thereby preventing displacement in one direction but depending solely on friction for preventing displacement in a transverse direction.

With my improved construction the cutter blades and the holders therefor are so constructed that when the blade is clamped, it is rigidly locked against movement in any direction and at the same time the construction is such that when unclamped the blade may be adjusted in transverse directions and capable of rigid locking in any position of adjustment. This is advantageous not only on account of the rigidity and protection against accidental displacement but also because it permits of still housing the blade after a considerable portion thereof has been ground away. Still further the blade may be adjusted either radially or laterally as conditions require.

Generally described my improvement comprises the forming of the adjacent faces of the blade and its holder with series of projections on the one and corresponding series of sockets on the other for receiving such projections. These series extend in transverse directions on both members and as the spacing between members of the series is uniform the blade may be adjusted in either of said transverse directions to any desired position and will there engage the holder.

While the projections and the sockets may be respectively placed on either of the cooperating members, preferably for convenience in manufacture the projections are formed on the holder, and the sockets on the blade or tool. This is for the reason that the socketed face can be more conveniently formed by hot forging while the projections can be produced in the cold metal by machining. Also the holder may be formed of relatively soft metal whereas the cutting blade is normally hard.

As shown in Figure 1 A is the body of a rotary milling cutter having notches B formed in the periphery thereof in which the cutter blades C are placed. One face D of the notch is provided with the series of projections E shown on enlarged scale in Figure 3. These can be conveniently made by milling series of V-shaped grooves F across the face D and in transverse directions. The tool or blade C has the face thereof which lies adjacent to the surface D formed with indentations or sockets G corresponding in spacing to the pyramidal points E. These may be formed by die forging or in any other suitable way and the relation of the sockets to the points is such that when the two members are placed together they will be held from any transverse movement also as the spacing between the points and the sockets is uniform in both directions relative lateral adjustment between said members is possible and in each position of adjustment they will be rigidly locked from lateral movement.

As shown in Figure 5 the pyramidal points E are slightly more obtuse in angle than the sockets G so as to avoid the striking of the points on the bottom of the socket and to insure contact of both sides of the point with the corresponding sides of the socket. This will prevent any lost motion and will hold the blade rigidly in an exact position.

Any suitable means for clamping the blades in the sockets may be employed but as shown wedges H are inserted in the sockets B on the opposite side of the blade C from that having the sockets. The wedges H may be clamped by a screw I or by any other suitable means.

With the construction as described the blade C may be set in any desired position as they are capable of being adjusted either radially or transversely of the milling head A. Thus the blades may be reset from time to time and will retain their utility as long as there is sufficient area for locking contact with the pointed surfaces D.

The blade C may, if desired, be made from bar stock, one side surface of which has been die fashioned in the manner above described, the bar being subsequently cut to suitable lengths for the individual tools.

While I have described my invention as specifically applied to milling cutters it is obvious that it is equally applicable to other uses.

What I claim as my invention is:

In an adjustable tool, the combination of a pair of members having contacting faces, one of said faces being formed with projecting points arranged in equi-spaced parallel series in each of transverse directions, and the other with corresponding spaced sockets for individually receiving said points whereby said members may be interlocked in various positions of adjustment in each of said transverse directions.

CARL J. OXFORD.